United States Patent
Balakrishnan

(10) Patent No.: US 10,529,236 B1
(45) Date of Patent: Jan. 7, 2020

(54) NOTIFICATIONS FOR AMBIENT DANGEROUS SITUATIONS

(71) Applicant: Cambridge Mobile Telematics Inc., Cambridge, MA (US)

(72) Inventor: Hari Balakrishnan, Belmont, MA (US)

(73) Assignee: Cambridge Mobile Telematics Inc., Cambridge, MA (US)

(*) Notice: Subject to any disclaimer, the term of this patent is extended or adjusted under 35 U.S.C. 154(b) by 0 days.

(21) Appl. No.: 16/155,416

(22) Filed: Oct. 9, 2018

(51) Int. Cl.
G08G 1/16 (2006.01)
H04W 4/02 (2018.01)

(52) U.S. Cl.
CPC ............ G08G 1/163 (2013.01); G08G 1/166 (2013.01); H04W 4/023 (2013.01); H04W 4/027 (2013.01)

(58) Field of Classification Search
CPC ....... G08G 1/163; G08G 1/166; H04W 4/023; H04W 4/027
See application file for complete search history.

(56) References Cited

U.S. PATENT DOCUMENTS

| | | | |
|---|---|---|---|
| 6,472,978 B1* | 10/2002 | Takagi | G08G 1/005 340/435 |
| 10,026,309 B1 | 7/2018 | Nepomuceno et al. | |
| 10,304,341 B1* | 5/2019 | Crasso | H04W 4/46 |
| 2013/0127638 A1* | 5/2013 | Harrison | G08G 1/166 340/903 |
| 2015/0312655 A1 | 10/2015 | Balakrishnan et al. | |
| 2018/0075747 A1* | 3/2018 | Pahwa | B60W 40/09 |

OTHER PUBLICATIONS

Vance, Steven, "10 thoughts on "doorings in Chicago and NYC are still a sorry state but one of them is doing something about it"," Sep. 28, 2012 [online], [retrieved on Oct. 4, 2018]. Retrieved from the Internet: http://gridchicago.com/2012/doorings-in-chicago-and-nyc-are-still-a-sorry-state-but-one-of-them-is-doing-something-about-it/.

* cited by examiner

Primary Examiner — James J Yang
(74) Attorney, Agent, or Firm — Fish & Richardson P.C.

(57) ABSTRACT

Among other aspects, information is received at or from a mobile device. The information is derived from one or more position or motion sensors of the mobile device. The derived information is indicative of a position or a velocity of the mobile device. The position or the velocity of the mobile device conforms to a position or a velocity of a vehicle. The derived information is used to identify a dangerous situation involving the vehicle and a person on foot or a bicyclist. A notification is provided of the dangerous situation.

9 Claims, 2 Drawing Sheets

NOTIFICATIONS FOR AMBIENT DANGEROUS SITUATIONS

BACKGROUND

Figure 1:
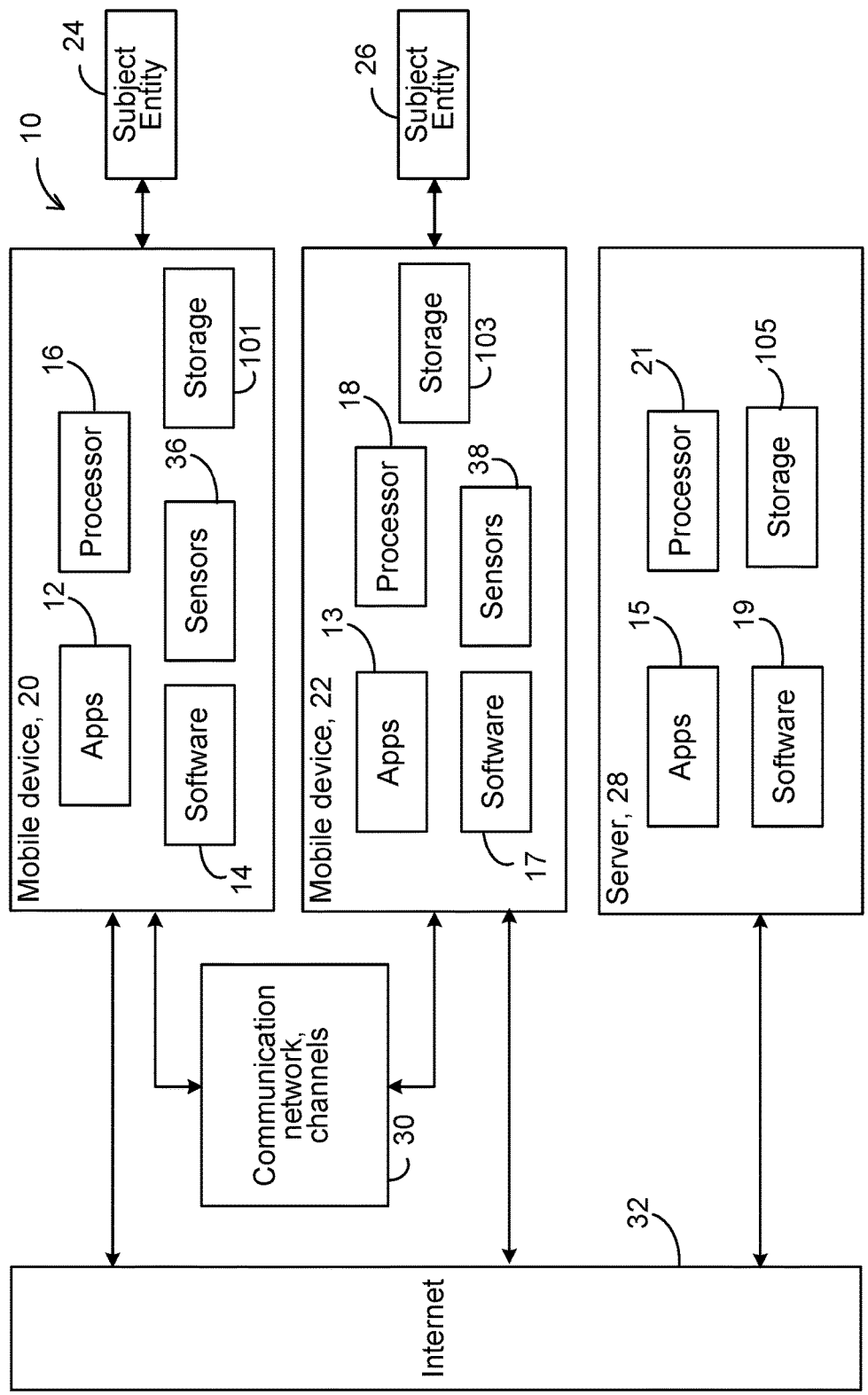

This description relates to notifications for ambient dangerous situations.

Bicyclist and pedestrian safety, especially in urban areas, is highly dependent on the attentiveness of vehicle drivers. Unfortunately, in practice, many accidents or other dangerous situations occur because drivers are either unaware of, or are not focused on, bicyclists and pedestrians, owing to various distractions while driving or to inconvenient "blind spots". Moreover, drivers, bicyclists, and pedestrians (that is, anyone on foot whether walking, running, or standing still) may themselves be distracted and be unaware of an impending accident or other dangerous situation involving another vehicle. The differences in speeds of travel, physical sizes, and degrees of protection from injury afforded between vehicles and people on foot or bicycles may make dangerous situations more prevalent and the injures more significant in collisions between people on foot or bicycles and other vehicles.

For example, an all-too-common phenomenon that endangers bicyclists, especially in urban areas, is "dooring". When a driver parks their car on the side of a road that's shared with bicyclists, they may open the door without looking at whether a bicyclist is nearby and hit the bicyclist causing them to fall and get injured. In certain dire situations, which unfortunately do occur in practice, the bicyclist may get thrown into the path of vehicular traffic, leading to significant injuries or even death. The number of such incidents is significant; for instance, a study estimated 344 such incidents in Chicago alone in 2011 (Doorings in Chicago and NYC are still a sorry state but one of them is doing something about it. http://gridchicago.com/2012/doorings-in-chicago-and-nyc-are-still-a-sorry-state-but-one-of-them-is-doing-something-about-it/). It is likely that thousands of such incidents occur around the world each month.

Other examples of accidents or other dangerous situations involving vehicles and bicyclists or pedestrians are at intersections, pedestrian crossings (whether marked or not), and when cars attempt to pass bicyclists or pedestrians.

SUMMARY

In general, in an aspect, information is received at or from a mobile device. The information is derived from one or more position or motion sensors of the mobile device. The derived information is indicative of a position or a velocity of the mobile device. The position or the velocity of the mobile device corresponds to a position or a velocity of a vehicle. The derived information is used to identify a dangerous situation involving the vehicle and a person on foot or a bicyclist. A notification is provided of the dangerous situation.

Implementations may include one or a combination of two or more of the following features. The vehicle is stopped by a side of a road and a bicyclist is moving along the road near the vehicle. The derived information includes an indication that the vehicle has recently stopped or is about to stop. The derived information includes an indication that the stopped vehicle has one or more people inside it. This information can be obtained using data from mobile phone sensors such as position sensors (GPS), accelerometer, or gyroscopes or combinations of them by analyzing the movement pattern from this data. The derived information includes an indication of the duration of time that the vehicle has been stopped. Too short a time, especially with no motion pattern indicating someone leaving the vehicle may be used to suppress the notification. The providing of the notification includes providing a notification to the bicyclist or the person on foot. The providing of the notification includes providing a notification to an occupant of the vehicle. The derived information is received in a wireless communication and the signal strength of the communication is indicative of the distance between the vehicle and the bicyclist or person on foot. The notification is presented by a mobile device. The mobile device includes a smart phone. The mobile device includes an electronic tag. The electronic tag is associated with a vehicle, a bicyclist, or a person on foot. Using the derived information to identify the dangerous situation includes determining if the dangerous situation is within a relevant geographic scope or relevant temporal scope with respect to the vehicle or the mobile device or electronic tag. Using the derived information to identify the dangerous situation includes identifying nascent dangerous situations and selecting dangerous situations from among the nascent dangerous situations, and sending notifications for the selected dangerous situations. The derived information is received from a tag, a mobile device, or a server. The derived information is communicated to a server. Receiving the derived information includes receiving the derived information through a server.

These and other aspects, features, and implementations (a) can be expressed as methods, apparatus, systems, components, program products, methods of doing business, means or steps for performing a function, and in other ways, and (b) will become apparent from the following descriptions, including the claims.

DESCRIPTION

Figure 2:
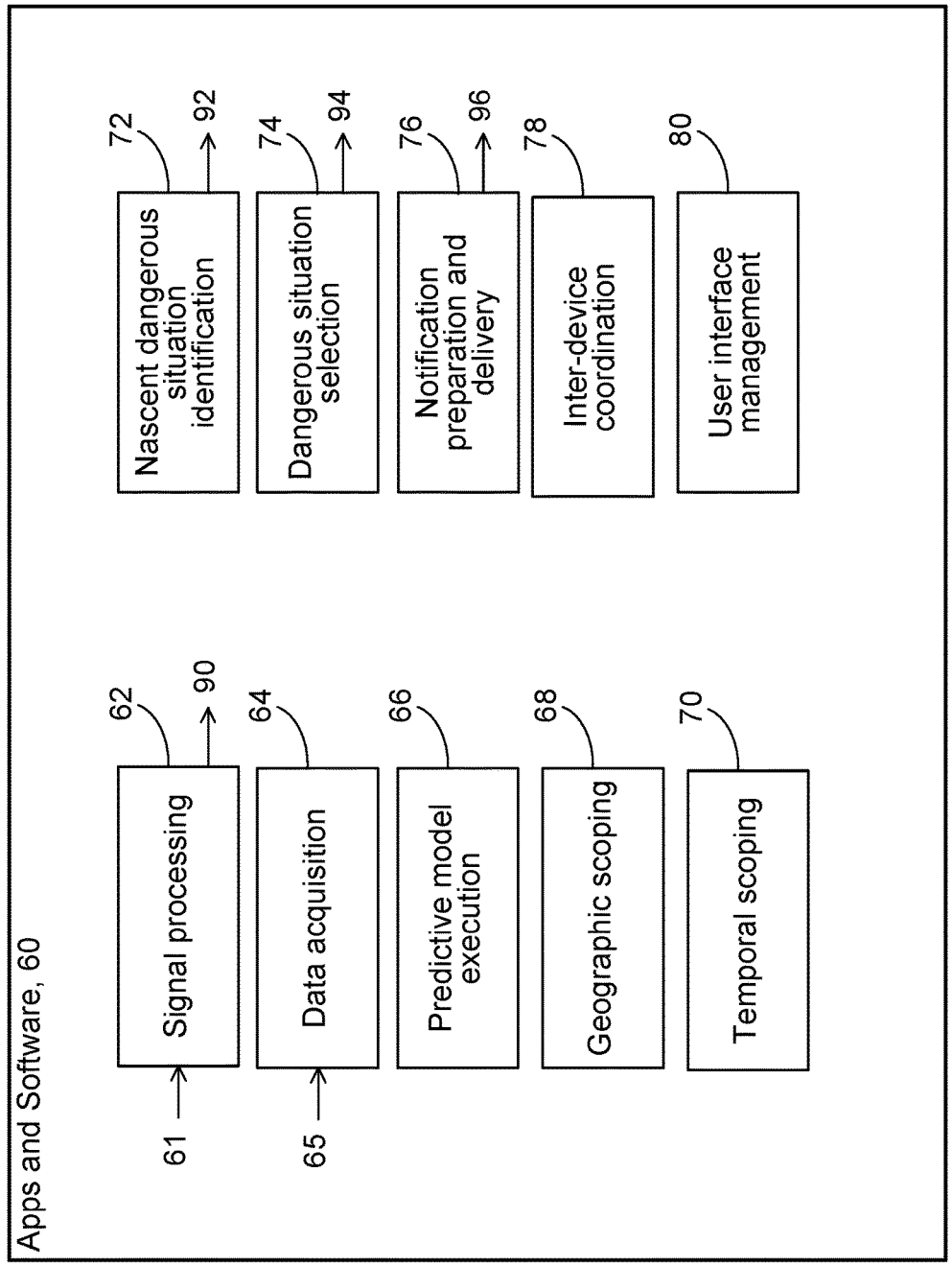

FIGS. 1 and 2 are block diagrams.

With the advent of sensor-equipped mobile phones, small network-enabled devices (which we sometimes call "tags") that can be embedded in vehicles (for example, the tag device developed by Cambridge Mobile Telematics (H. Balakrishnan, L. D. Girod, I. Ossin, System and Method for Obtaining Vehicle Telematics Data, published United States patent application 2015/0312655, incorporated here by reference), and other mobile devices, it is possible to use technology to provide notifications to bicyclists and people on foot of dangerous situations posed by nearby vehicles and to provide notifications to drivers of potential dangerous situations involving bicyclists and people on foot outside their vehicles. These notifications can be distributed wirelessly through one or more channels such as cellular, Wi-Fi, Bluetooth, other radio, acoustic, or ultrasound, for example.

The technology that we describe here (the "technology") can acquire and process information needed to identify dangerous situations and to provide appropriate notifications to drivers or other occupants of vehicles and to bicyclists and people on foot. The technology can constrain the number and frequency of notifications to those that are relevant and sensible so that recipients will not reduce their attention to the notifications or find them annoying. Such constraints can enable the technology to focus, for example, on dangerous situations that are identified for a relatively small geographic area in a vicinity of a vehicle or a bicyclist or person on foot or a relatively short period of time in the future or both. With these constraints in mind, we sometimes refer to the notifications as "ambient safety notifications".

At a high level, in some implementations, the technology relies on information about the positions or velocities or both of one or more vehicles and one or more people on foot or bicyclists that may be the subject of a dangerous situation. We sometimes refer to such vehicles, people on foot, and bicyclists simply as "subject entities". Based on the information about the positions and velocities of the subject entities, the technology can identify an ambient dangerous situation, such as the likelihood of a collision during a (short) future time period (e.g., between 1 and 60 seconds, typically, depending on the application).

An example of an ambient dangerous situation is a possible collision of a bicyclist or a person on foot (e.g., a pedestrian or a runner) with a vehicle. The ambient dangerous situation could arise, for example, between a vehicle that has just been parked on a side of a street and a bicyclist traveling along the street and approaching the vehicle. The driver in the vehicle may carelessly open the vehicle door across the path of the bicyclist at a moment when the bicyclist does not have enough time to avoid hitting the door. Ambient dangerous situations can also happen at intersections and in a wide variety of other circumstances, locations, and times. An ambient dangerous situation may involve more than one vehicle or more than one person on foot or more than one bicyclist, or combinations of them. Each of these subject entities can be tracked by and receive notifications from the technology.

We use the term "subject entity" broadly to refer to any vehicle, person on foot, or bicyclist who is a subject of any of the features or functions of the technology. Examples of subject entities are a vehicle for which the position or velocity is being monitored or a pedestrian to whom an ambient safety notification may be sent, to name just two.

When we refer to "velocity" we mean a speed and a direction, in other words, a vector.

We use the term "dangerous situation" broadly to include, for example, any circumstance or occasion that may lead to injury, death, or property damage and involves one or more vehicles and one or more people on foot or bicyclists.

We use the term "ambient dangerous situation" to include, for example, a dangerous situation within a relevant geographic scope or a relevant temporal scope or both. A given dangerous situation can be considered an ambient dangerous situation with respect to a particular subject entity but not with respect to another subject entity. For example the technology could consider an identified dangerous situation between a bicyclist and a parked car to be an ambient dangerous situation for the car because the bicyclist is within a relevant geographic scope of the car at that time, but not an ambient dangerous situation for the bicyclist because the car is not within a relevant geographic scope of the bicyclist at that time.

We use the term "selected ambient dangerous situation" or "selected dangerous situation" broadly to include, for example, any ambient dangerous situation that has been determined by the technology to be appropriate for sending an ambient safety notification in light of constraints on the number or frequency of notifications.

We use the term "relevant geographic scope" to include, for example, a geographic area in the vicinity of a subject entity that is pertinent to dangerous situations for the subject entity.

In some implementations, the relevant geographic scope for a subject entity can depend on the type of subject entity or on its position and velocity or other factors and combinations of them. For example, when a vehicle has been moving at a high velocity in a particular direction, the relevant geographic scope could be a sector of a circle in front of the vehicle having a length vehicle that relates to the distance that the vehicle is predicted to travel in that direction in a given period of time, for example, in a range from one second to five seconds, or fifteen seconds, or 60 seconds.

We use the term "relevant temporal scope" to include, for example, a future time period in which a collision may occur as a result of a dangerous situation for a subject entity.

In some cases, the relevant temporal scope for a subject entity can depend on the type of subject entity or its position and velocity or other factors and combinations of them. For a pedestrian walking on a sidewalk at three miles per hour, the relevant temporal scope could be based on how long it would be predicted for the pedestrian to require to walk (or run) away from a dangerous situation after receiving a notification. That relevant temporal scope could be, for example, in a range from two seconds to five seconds or ten seconds.

By continually tracking positions and velocities of subject entities the technology can identify nascent dangerous situations. Nascent dangerous situations may or may not develop into actual dangerous situations. For example, when a vehicle and a bicyclist are approaching an intersection from different directions, they may possibly collide at the intersection. In theory, the technology could issue repeated notifications to the bicyclist, the driver of the vehicle, or both beginning when the technology first determines that they are both headed toward the intersection, that is, determines the existence of a nascent dangerous situation. However, if the technology sent such notifications repeatedly for every identified nascent dangerous situation, the number of received notifications could be overwhelming, the bicyclist and driver of the vehicle might tend to disregard them, and the effectiveness of the notifications would be diminished.

To reduce the volume of notifications to a given subject entity and to increase the chances that notifications will be understood and acted on, the technology applies a selection process to determine which identified nascent dangerous situations should become selected dangerous situations and therefore trigger notifications to one or more subject entities. In some implementations, for this purpose, the selection process can continually determine the relevant temporal scope and relevant geographic scope for each subject entity and apply the scopes to nascent dangerous situations to determine if they are actual dangerous situations that should trigger notifications. Other rules and processes and combinations of them can be used to determine selected dangerous situations.

For example a bicyclist traveling northwards should not be warned of a car parked on the opposite side of the road, even though the car may be within the car's relevant geographic scope. Therefore, it can be important to take into account the directionality of motion of the car prior to parking and the directionality of the bicyclist's motion.

Typically a dangerous situation involves a possible collision of at least two subject entities, one a vehicle and the other a person on foot or bicyclist. To identify dangerous situations the technology can use past, current, and predicted future position and velocity information about the subject entities to determine whether they are likely to be in the same position at the same time in the future. The technology also can predict the likelihood of such a collision based in part on whether an identified dangerous situation is within a relevant temporal scope or geographic scope or both for one or more subject entities.

As shown in FIG. 1, in some cases the features and functions of the technology 10 can be implemented by apps 12, 13, 15 or other software 14, 17, 19 (executable instructions) executed by processors 16, 18, 21 running on mobile devices 20, 22, such as tags or mobile phones associated with subject entities 24, 26, or on servers 28 that can be remote from the subject entities. The mobile devices and servers (we sometimes together call these "the devices") can communicate at least partly wirelessly through communication networks 30. The communication networks can include the Internet, cellular networks, and local short-range networks using a wide variety of protocols, including Wi-Fi, Bluetooth, other radio, acoustic, or ultrasound, for example.

Each of the processors can use information derived from position and motion sensors 36, 38 of the mobile devices 20, 22 (including, for example, electronic tags located on or in one or more vehicles or bicycles or in the possession of or worn by one or more people on foot or bicyclists). In some implementations the position and motion information for one or more of the subject entities can be sent wirelessly through the Internet 32 to the server 28 and the processor 21 at the server can identify ambient dangerous situations, manage the sending of notifications, and perform other operations.

The mobile devices can also include cameras capable of capturing images or video of the environment within, for example, a relevant geographic scope of a subject entity. The sensors can include GPS receivers and GPS-signal processors and inertial measuring devices such as an accelerometer and gyroscope, a magnetometer, and devices that can process cellular signals to determine position, among others.

As shown in FIG. 2, a wide variety executable processes can be implemented in functional blocks of the apps and other software 60 to provide functions and features of the technology. The blocks may perform, for example, signal processing 62 of raw signals 61 from sensors, data acquisition 64 from data producing sensors, other data sources, and stored data 65, predictive model execution 66, geographic scoping 74, temporal scoping 76, nascent dangerous situation identification 70, dangerous situation selection 72, notification preparation and delivery 78, inter-device coordination 80, and user interface management 82, among other features and functions. Each of these functions and features can be performed at any of the mobile devices or at the server or the performance of the functions and features can be shared cooperatively by one or more of the mobile devices and the server.

We discuss these features and functions below.

In some implementations, the executable instructions cause the processors to process raw signals provided by the sensors of the devices, for example, raw position, velocity, or acceleration signals and raw image and video signals. The result of the processing can be a time sequence of processed position and velocity signals or data 90 for a subject entity associated with a device from which the raw signals were drawn. The frequency of occurrence of the resulting signals or data in the time sequence can depend on the type of subject entity, the processing capability of the processor, and other factors. In some cases, the frequency can be in the range of 100 per second to 1 every 10 seconds, for example. The resulting signals or data in the time sequence can be stored locally in a storage device 101, 103 of the mobile device, can be sent by wireless communication to another mobile device or to the server for storage 105 or processing, or combinations of those.

In some instances, the executable instructions cause the processors to acquire data 65 from a local mobile device or to acquire data by communication through one of the communication networks or channels from other mobile devices or servers through the communication networks or channels. The acquired data can represent raw or processed signals quantifying, for example, the position or velocity of a local mobile device or of other mobile devices, information about identified nascent dangerous situations or selected dangerous situations, or notifications of dangerous situations, among other things. The acquired data can be organized as time sequences of data occurring with frequencies similar to those mentioned for the raw signals. The acquired data can be stored in a local storage of a mobile device for later use.

The executable instructions can cause the processor to predict the locations or velocities of one or more subject entities in the future, which enables determinations of dangerous situations and assists selection of selected dangerous situations. The predictions can be based on models of behavior of subject entities of different types, on historical information about the behaviors of particular subject entities, and on the stored data about current and recent positions and velocities of subject entities.

The executable instructions can cause the processor to generate relevant geographic scopes for one or more of the subject entities dynamically as time passes based, for example, on the type of subject entity, the current position and velocity of the subject entity, and other factors, and combinations of them. Similar factors can be used by the processor in executing the instructions to generate relevant temporal scopes for one or more of the subject entities. Updated relevant geographic and temporal scopes can be generated frequently, for example, once a second or more or less frequently than once a second.

The executable instructions can cause the processor to identify nascent dangerous situations based on information about the position and velocity of one or more subject entities, their predicted positions and velocities in the future, and comparisons of the future trajectories (positions and velocities) of the subject entities. The output of the process can be a list of nascent dangerous situations 92, each record of which identifies one or more subject entities that are the subject of the dangerous situation, the predicted time of the nascent dangerous situation, and the predicted location of the nascent dangerous situation. The records can be stored temporarily and updated frequently to maintain accurate current information about nascent dangerous situations.

The information derived from sensors can include an indication that the stopped vehicle has one or more people inside it. This information can be obtained using data from mobile phone sensors such as position sensors (GPS), accelerometer, and/or gyroscopes or combinations of them by analyzing the movement pattern from this data. The derived information includes an indication of the duration of time that the vehicle has been stopped. Too short a time, especially with no motion pattern indicating someone leaving the vehicle may be used to suppress the notification. The providing of the notification includes providing a notification to the bicyclist or the person on foot. The providing of the notification includes providing a notification to an occupant of the vehicle. The derived information is received in a wireless communication and the signal strength of the communication is indicative of the distance between the vehicle and the bicyclist or person on foot.

The executable instructions can cause the processor to filter the nascent dangerous situations to identify among the nascent dangerous situations, selected dangerous situations 94 for which notifications should be communicated to subject entities. The notifiable dangerous situations can be identified independently with respect to each of the subject entities. The selection can be based on the urgency of the dangerous situation in terms of the relevant geographic scope or the temporal geographic scope, or both, the number or frequency of previously sent notifications with respect to the dangerous situation, the number or frequency of notifications previously sent to a given subject entity for all dangerous situations, the predicted likelihood of a collision related to the dangerous situation, the type of subject entity, and other factors, and combinations of them.

The executable instructions can cause the processor to prepare and deliver notifications. The output of the process can be a queue or other list 96 of planned notifications to be communicated. Each of the notifications can include a unique identification index, an identification of the subject entity to which it is to be sent, an indication of the content of the notification and the mode of presentation (text, image, video, sound, or other mode of presentation), an indication of the urgency of the notification, and the time when the notification is to be presented, a protocol to be used in the communication, and other items of information, and combinations of them. The executable instructions can cause the processor to communicate the notifications to the subject entities at the specified times. Each of the notifications can be sent from the mobile device or server that generated the planned notification or by another one of the mobile devices or servers to which the planned notification may have be sent for action. The notification can be sent wirelessly using any available wireless network such as Bluetooth, Wi-Fi or cellular. At the mobile device that receives the notification for presentation to a bicyclist, driver, or other user, the executable instructions cause the processor to receive and queue the notifications for presentation. The order of the queue can be based on the indicated time at which the notification is to be presented, the urgency of the notification, the number of other notifications in the queue, the mode of presentation of the notification, and other factors, and combinations of them. The processor at the mobile device can present the notifications in the order in which they appear in the queue. For each notification, the processor can determine whether the time for presentation has passed and if so whether to present the notification anyway, and determine whether the indicated mode of presentation is within the capability of the mobile device and if not arrange a substitute mode of presentation, and then present the notification to the user. The processor can in some cases sent a reply to the source of the notification to confirm its presentation.

Notification must be communicated with relatively low delay, so delivery using local wireless broadcasts is a useful approach. The apps on the mobile devices must be capable of background operation using standard mobile OS APIs (including on Android and iOS). However, as noted earlier, cloud-based server coordination and operation is also possible. In that case, the server can act as a clearinghouse, in effect. Every mobile device sends its broadcast information (position, velocity, etc.) to the server, and any interested subject entity in the vicinity can query the server to retrieve relevant planned notifications based on which it can present the notifications to a user. In some instances, notifications could be issued from a server and merely presented by from the mobile device to an end user.

The executable instructions can cause the processors in one or more of the mobile devices or the server to coordinate their operations to perform one or more of the features and functions discussed above. In the operation of the technology, data is continually being acquired and generated by two or more independent mobile devices and servers. Although the data is acquired or generated independently, coordinated accumulation, organization, and processing of the data is desirable or necessary for effective identification of dangerous situations, determination of selected dangerous situations, and preparation and delivery of notifications to subject entities.

The executable instructions can cause the processor at each mobile device that presents notifications to manage and expose to the user a user interface through which the notifications are presented and with which a user can control the notification system. The user interface at a mobile device can enable user registration, account control, preferences, presentation of notifications, receipt of acknowledgements and other user input, and other functions and features. For example, the user interface can enable a user to turn the notifications on or off, to specify the frequency and urgency of notifications that the user is willing to accept, and to control the mode of presentation of the notifications, among other preferences.

A wide variety of implementations and applications of the technology are possible.

In one example, dooring of a bicyclist might be prevented by having a driver's mobile phone determine (based on information derived from position and velocity sensors of the mobile phone) that the car has recently stopped at a location at the side of a road and then warn the driver by a notification in the form of a loud sound or a haptic vibration to check for bicyclists before opening her door.

Some implementations can use a driving app running on a smart phone (device A) used by a driver of a vehicle. The driving app can implement other features in addition to the features of the technology that we describe here. In some cases, the driving app automatically records telematics data (for example, position, velocity, acceleration) from the phone's sensors while the vehicle is being driven. The smart phone therefore knows almost immediately when the vehicle has stopped and the direction of travel prior to stopping. Once the vehicle has been stopped, the app determines from the position reported in the telematics data and stored map data that the driver may have parked the vehicle, for example, next to the side of a street or road. The driving app then determines that a nascent dangerous situation exists with respect to, for example, bicyclists who may be traveling along the road in the same direction in a lane next to the parked car. The driving app may then determine that the nascent dangerous situation should be a selected ambient dangerous situation that triggers a notification. The driving app may then start broadcasting a "PARKED_CAR" notification on a wireless channel. This channel may be a Bluetooth Low Energy (BLE) broadcast (i.e., a Bluetooth beacon), or could be over a Wi-Fi (802.11) radio, or could be on an acoustic channel using a speaker at either an audible or inaudible (ultrasonic) frequency, or combinations of those.

At a different subject entity that may be vulnerable to the selected dangerous situation relative to the vehicle (for example, a bicyclist having a relevant geographic and temporal scope) a background app running on a smart phone (device B) records telematics data from the phone's sensors. The mobile device can determine whether the mode of transportation is bicycling, walking, or some other mode based on the telematics data (such as the recent velocity profile). If the mobile device B determines that the subject entity with which it is associated is operating in a particular one or more specified modes (e.g., bicycling), the mobile device automatically starts listening for a PARKED_CAR broadcast notification on one or more wireless channels. If device B hears such a message, the smart phone app on device B (associated with the bicyclist) compares its own position and velocity (including direction) to the position of the parked car associated with device A from which the notification has been broadcast. The position of the parked car may be provided in one or more of the following ways (and possibly others):

1. The broadcast notification can include a GPS latitude/longitude/altitude position or other position encoding.

2. The broadcast notification can include a unique identifier (associated with device A, or the user of device A, or possibly the vehicle that is currently associated with device A); the mapping between the unique identifier and the current position of device A can be obtained at one of the servers (in the cloud), which acts as a central repository to accumulate, stored, and then provide this information to authorized parties.

3. The position could be distributed on a different radio channel (e.g., Wi-Fi, even as an access point identifier) from the PARKED_CAR notification broadcast (which could be on BLE).

If device B is moving in a direction that is getting closer to notification broadcasting device A, then the PARKED_CAR notification could be considered a notification of high relevance and further action taken as described below. For example, if the device B moves to a location for which the position of device A is within device B's geographic scope, then device B could treat the notification as relatively urgent in the process of selection incoming notifications.

The position of the parked car may also be inferred implicitly using radio ranging. For example, if device B is detecting an increase in signal strength of the broadcast from device A, then device B may conclude that the relevance of this broadcast is high. Otherwise, device B may filter out the notification, in effect ignoring it.

If the strength of the received broadcast signal is at least as high as a threshold signal strength (which could be set dynamically), the device B could present a notification to the user using a user-observable audio, text, or other presentation mode on the mobile device B. In such a case, the device B infers the existence of an ambient dangerous situation based on the signal strength and can formulate its own notification for presentation to the user of device B. In other words, the simple receipt of the broadcast message with a high enough signal strength is itself a sufficient indication of an ambient dangerous situation to trigger device B to formulate and present a notification.

This example of an ambient safety notification is illustrative and generalizes to many other examples such as:

1. Pedestrians or bicyclists being warned if a car is moving too fast toward them.

2. Pedestrians or bicyclists being warned in a more intrusive way if their mobile app running in the background determines that they may be engaged in a phone call while walking and may not be paying attention to the road.

3. Bicyclists or pedestrians being warned if a vehicle is on track to come too close to them, and also vice versa (warning a driver if their vehicle is on track to come too close to a bicyclist or a person on foot).

4. A driver of a vehicle being warned of a bicyclist or pedestrian being very close. In this use case, device A (broadcasting) would be the bicyclist or pedestrian, and device B (receiving) would be in the vehicle.

In some implementations that use tags, a tag can includes acceleration sensors that can detect when a vehicle has stopped and can trigger the PARKED_CAR notification on every vehicle stop that exceeds a certain period of time (such as a period in a range between three seconds and 10 seconds, for example). (the period may be set dynamically). The notification then can be broadcast from the mobile device. If the phone is used, the location (determined by the phone app) may be included in the notification, but this is not essential. The listening device (device B) can use ranging based on signal strength (as explained above) to determine whether to present a notification to the user.

A tag can also function as the listening device instead of or in addition to the notification sending device. The tag doesn't need to be on a vehicle; it could be on a bicyclist or on a person on foot. The mobile device could in some cases by a smart watch or a sensor-equipped wearable (with local or wide-area wireless communication capabilities)

Other implementations are within the scope of the following claims.

The invention claimed is:

1. A machine-based method comprising
at a mobile device of a person in a vehicle, acquiring information about one or more of position, velocity, and directionality from sensors on the mobile device,
at the mobile device of the person in the vehicle, identifying a position of the vehicle from the acquired information,
at the mobile device of the person in the vehicle, determining from the identified position and from map information or from information about vehicle turns that the vehicle has stopped at a location at the side of a road,
at the mobile device of the person in the vehicle, determining a time duration for which the vehicle has been stopped,
at the mobile device of the person in the vehicle, determining that the time duration for which the vehicle has been stopped has exceeded a threshold period of time,
at the mobile device of the person, determining whether the person has departed the vehicle,
at the mobile device of the person and based on a determination that the vehicle has stopped at a location at the side of a road, a determination that the time duration for which the vehicle has been stopped has exceeded the threshold time period, and a lack of a determination that the person has not departed the vehicle, determining existence of a dangerous situation in which the person in the vehicle may open a door of the vehicle causing injury to a bicyclist traveling on the road, and
providing notification of the dangerous situation.

2. The method of claim 1 in which providing the notification comprises providing a notification to the bicyclist.

3. The method of claim 1 in which providing the notification comprises providing a notification to a driver or other occupant of the vehicle.

4. The method of claim 1 in which the notification is presented by the mobile device of the person.

5. The method of claim 1 in which the mobile device comprises a smart phone.

6. The method of claim 1 comprising, at the mobile device of the person the vehicle, determining a direction of travel of the vehicle before the vehicle has stopped.

7. The method of claim 1 in which the notification comprises a sound or a haptic vibration or both.

8. The method of claim 1 comprising the mobile device of the person broadcasting a notification on a wireless channel.

9. The method of claim 1 in which the threshold period of time is in a range between three seconds and 10 seconds.

\* \* \* \* \*

UNITED STATES PATENT AND TRADEMARK OFFICE
CERTIFICATE OF CORRECTION

PATENT NO. : 10,529,236 B1
APPLICATION NO. : 16/155416
DATED : January 7, 2020
INVENTOR(S) : Hari Balakrishnan Page 1 of 1

It is certified that error appears in the above-identified patent and that said Letters Patent is hereby corrected as shown below:

In the Claims

Column 10, Line 46 (approx.): In Claim 1, after "has" delete "not".

Signed and Sealed this
Twenty-fourth Day of March, 2020

Andrei Iancu
*Director of the United States Patent and Trademark Office*